(12) United States Patent
Qi et al.

(10) Patent No.: US 12,744,494 B2
(45) Date of Patent: Sep. 22, 2026

(54) PHOTOVOLTAIC SYSTEM AND CIRCUIT PROTECTION METHOD FOR PHOTOVOLTAIC SYSTEM

(71) Applicant: Huawei Digital Power Technologies Co., Ltd., Shenzhen (CN)

(72) Inventors: Xin Qi, Shanghai (CN); Zhiwu Xu, Shenzhen (CN); Xiufeng Zhang, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/092,181

(22) Filed: Mar. 27, 2025

(65) Prior Publication Data

US 2025/0226794 A1 Jul. 10, 2025

Related U.S. Application Data

(63) Continuation of application No. PCT/CN2023/120195, filed on Sep. 20, 2023.

(30) Foreign Application Priority Data

Sep. 28, 2022 (CN) ........................ 202211191849.2

(51) Int. Cl.
*H02S 40/32* (2014.01)
*H02H 7/12* (2006.01)
(Continued)

(52) U.S. Cl.
CPC ........... *H02S 40/32* (2014.12); *H02H 7/1213* (2013.01); *H02J 3/381* (2013.01); *H02M 3/157* (2013.01); *H02S 50/10* (2014.12); *H02J 2101/24* (2026.01)

(58) Field of Classification Search
CPC ...... H02S 40/32; H02S 50/10; H02J 2101/24; H02J 3/381; H02M 3/157; H02H 7/1213
See application file for complete search history.

(56) References Cited

U.S. PATENT DOCUMENTS 10,084,303 B2 * 9/2018 Schulze .................. H02S 40/32
2012/0126626 A1 * 5/2012 Falk .......................... H02J 1/10
307/80

(Continued)

FOREIGN PATENT DOCUMENTS

CN 102484368 B 7/2015
CN 210273964 U 4/2020

(Continued)

*Primary Examiner* — Mayla Gonzalez Ramos
(74) *Attorney, Agent, or Firm* — Maier & Maier, PLLC

(57) ABSTRACT

A photovoltaic system includes an active protection switch, a direct current-direct current conversion circuit, and a controller. The active protection switch is configured to connect to a photovoltaic module, and the direct current-direct current conversion circuit. The direct current-direct current conversion circuit is configured to connect to a load. The controller is configured to: when a reverse current of a photovoltaic unit is greater than or equal to a current threshold, deliver, to the active protection switch based on an input voltage of the direct current-direct current conversion circuit, a breaking instruction used to trigger the active protection switch to be turned off; and when the active protection switch is not effectively turned off within preset duration after the breaking instruction is delivered to the active protection switch, regulate the input voltage of the direct current-direct current conversion circuit to be less than or equal to a first voltage threshold.

16 Claims, 4 Drawing Sheets

(51) Int. Cl.

| | |
|---|---|
| ***H02J 3/38*** | (2026.01) |
| ***H02J 101/24*** | (2026.01) |
| ***H02M 3/157*** | (2006.01) |
| ***H02S 50/10*** | (2014.01) |

(56) References Cited

U.S. PATENT DOCUMENTS

2012/0139347 A1* 6/2012 Hackenberg .............. H02J 1/10
307/71
2021/0391710 A1* 12/2021 Yang ........................ H02H 7/20

FOREIGN PATENT DOCUMENTS

| | | | |
|---|---|---|---|
| CN | 109638795 | B | 7/2020 |
| CN | 211127119 | U | 7/2020 |
| CN | 114301390 | A | 4/2022 |
| CN | 115528649 | A | 12/2022 |

* cited by examiner

Perform breaking protection

Perform breaking protection

301

Input voltage≥third voltage threshold?

Yes

No

302

Decrease the input voltage to be less than or equal to a first voltage threshold

303

Deliver a breaking instruction

PHOTOVOLTAIC SYSTEM AND CIRCUIT PROTECTION METHOD FOR PHOTOVOLTAIC SYSTEM

CROSS-REFERENCE TO RELATED APPLICATIONS

This application is a continuation of International Application No. PCT/CN2023/120195, filed on Sep. 20, 2023, which claims priority to Chinese Patent Application No. 202211191849.2, filed on Sep. 28, 2022. The disclosures of the aforementioned applications are hereby incorporated by reference in their entireties.

TECHNICAL FIELD

The embodiments relate to the field of photovoltaic power generation technologies, and to a photovoltaic system and a circuit protection method for a photovoltaic system.

BACKGROUND

With development of the photovoltaic industry, a photovoltaic system continuously evolves towards higher power. However, an increase in the power of the photovoltaic system also leads to a continuous increase in safety risks. If timely and effective protection cannot be provided, not only a photovoltaic module, an inverter, or the like in the photovoltaic system may be burnt, but also a single point of failure is prone to spreading, causing a more serious accident.

To resolve this problem, a protection apparatus may be disposed in the photovoltaic system. When a fault occurs, the protection apparatus may cut off an energy input to the photovoltaic module. However, the protection apparatus may fail to cut off a circuit due to a mechanical failure, and this may bring a safety risk to the photovoltaic system.

SUMMARY

The embodiments provide a photovoltaic system and a circuit protection method for the photovoltaic system, so that when it is detected that a protection apparatus is not effectively disconnected, a reverse current in the photovoltaic system can be eliminated by using a further protection measure, to avoid burning and fault spreading in the photovoltaic system. This improves safety and reliability of the photovoltaic system.

According to a first aspect, the embodiments provide a photovoltaic system, including an active protection switch, a direct current-direct current conversion circuit, and a controller. One end of the active protection switch is configured to connect to a photovoltaic module, the other end is connected to an input of the direct current-direct current conversion circuit, and an output of the direct current-direct current conversion circuit is configured to connect to a load. The controller is configured to: when a reverse current of the photovoltaic module is greater than or equal to a current threshold, deliver, to the active protection switch based on an input voltage of the direct current-direct current conversion circuit, a breaking instruction used to trigger the active protection switch to be turned off; and when the active protection switch is not effectively turned off within preset duration after the breaking instruction is delivered to the active protection switch, regulate the input voltage of the direct current-direct current conversion circuit to be less than or equal to a first voltage threshold.

In the photovoltaic system in this solution, when the reverse current is detected, a fault scenario can be further determined by using the input voltage of the direct current-direct current conversion circuit. After the fault scenario is determined, circuit protection can be performed by disconnecting active protection. When it is detected that the active protection switch fails to be turned off, the reverse current in the photovoltaic system can be eliminated by using a further protection measure in which the input voltage of the direct current-direct current conversion circuit is decreased, to avoid burning and fault spreading in the photovoltaic system. This improves safety and reliability of the photovoltaic system.

In an implementation of the first aspect, the controller is configured to: when detecting that a current of the direct current-direct current conversion circuit is greater than or equal to a critical value, detect that the active protection switch is not effectively turned off. In this solution, whether the active protection switch is effectively turned off may be determined by detecting the current of the direct current-direct current conversion circuit. This has a simple design, facilitates mass production, and has high reliability.

In an implementation of the first aspect, the controller is configured to: regulate the input voltage of the direct current-direct current conversion circuit to be greater than 0 and less than or equal to the first voltage threshold, and when detecting that the current of the direct current-direct current conversion circuit is greater than or equal to the critical value, detect that the active protection switch is not effectively turned off.

In this solution, the input voltage is controlled to be greater than 0 and less than or equal to the first voltage threshold, so that the direct current-direct current conversion circuit is in a state that is close to a short circuit but is not short-circuited. Whether the active protection switch is effectively turned off can be detected, and an output voltage of the direct current-direct current conversion circuit can be maintained at a specific value, to power the load in a photovoltaic inverter (the load may include a heat dissipation apparatus, and the heat dissipation apparatus can be driven by electric energy to operate, to maintain heat dissipation performance of the photovoltaic inverter), so that the photovoltaic inverter does not need to be additionally powered. This can simplify the design, and reduce costs.

In an implementation of the first aspect, the controller is configured to: control a switching component of the direct current-direct current conversion circuit to keep normally on, and when detecting that the current of the direct current-direct current conversion circuit is greater than or equal to the critical value, detect that the active protection switch is not effectively turned off. Determining logic of this solution is simple. This facilitates the mass production, and has the high reliability.

In an implementation of the first aspect, the active protection switch is configured to generate a contact position feedback signal. The controller is configured to: when detecting that the contact position feedback signal is a target signal, detect that the active protection switch is not effectively turned off. A circuit design and the determining logic of this solution are simple. This facilitates the mass production, and has the high reliability.

In an implementation of the first aspect, the controller is configured to: when detecting that the input voltage of the direct current-direct current circuit is greater than or equal to a second voltage threshold, detect that the active protection switch is not effectively turned off. In this solution, whether the active protection switch is effectively turned off may be determined by detecting the input voltage of the direct current-direct current conversion circuit. This has the simple design, facilitates the mass production, and has the high reliability.

In an implementation of the first aspect, the controller is configured to: when detecting that the active protection switch is not effectively turned off, regulate the input voltage of the direct current-direct current conversion circuit to be greater than 0 and less than or equal to the first voltage threshold. In this solution, the input voltage is controlled to be greater than 0 and less than or equal to the first voltage threshold, so that the direct current-direct current conversion circuit is in the state that is close to the short circuit but is not short-circuited. The reverse current flowing through the photovoltaic module can be decreased, and the output voltage of the direct current-direct current conversion circuit can be maintained at the specific value, to power the load in the photovoltaic inverter (the load may include the heat dissipation apparatus, and the heat dissipation apparatus can be driven by electric energy to operate, to maintain the heat dissipation performance of the photovoltaic inverter), so that the photovoltaic inverter does not need to be additionally powered. This can simplify the design, and reduce the costs.

In an implementation of the first aspect, the controller is configured to control the direct current-direct current conversion circuit to generate a target output voltage, to enable the input voltage of the direct current-direct current conversion circuit to be greater than 0 and less than or equal to the first voltage threshold. In this solution, the output voltage of the direct current-direct current conversion circuit is controlled, to regulate the input voltage of the direct current-direct current conversion circuit. This has the simple design, and facilitates the mass production.

In an implementation of the first aspect, the controller is configured to: when detecting that the active protection switch is not effectively turned off, control the switching component of the direct current-direct current conversion circuit to keep normally on. In this solution, the direct current-direct current conversion circuit may be in a short-circuit state, and the input voltage of the direct current-direct current conversion circuit may be decreased to 0. In this solution, the direct current-direct current conversion circuit is in the short-circuit state, so that a reverse current flowing through a photovoltaic unit can be decreased.

In an implementation of the first aspect, the controller is further configured to: when the reverse current of the photovoltaic module is greater than or equal to the current threshold, and the input voltage of the direct current-direct current conversion circuit is less than a fourth voltage threshold, deliver the breaking instruction to the active protection switch. Alternatively, the controller is configured to: when the reverse current of the photovoltaic module is greater than or equal to the current threshold, the input voltage of the direct current-direct current conversion circuit is greater than or equal to a fourth voltage threshold, and it is detected that the reverse current is greater than the current threshold after specified duration, deliver the breaking instruction to the active protection switch.

In this solution, the controller may determine the fault scenario based on the reverse current and the input voltage. When the input voltage is less than the fourth voltage threshold, the controller determines that a reverse polarity connection fault occurs. In this case, the controller delivers the breaking instruction to the active protection switch to perform a breaking protection action, to decrease the reverse current. When the input voltage is greater than or equal to the fourth voltage threshold, the controller determines that an open-circuit voltage inconsistency fault occurs. In this case, the controller may determine waiting duration, and continuously detect the reverse current within the waiting duration. If detecting that the reverse current still does not disappear after the waiting duration, the controller performs the breaking protection action.

In this solution, different fault scenarios can be identified based on the reverse current and the input voltage, and different protection actions are performed for the different fault scenarios.

The controller is configured to: when the reverse current of the photovoltaic module is greater than or equal to the current threshold, and the input voltage of the direct current-direct current conversion circuit is greater than or equal to a third voltage threshold, regulate the input voltage of the direct current-direct current conversion circuit to be less than or equal to the first voltage threshold, and deliver the breaking instruction to the active protection switch, where the third voltage threshold is greater than the first voltage threshold.

In this solution, when the controller determines that the input voltage is greater than or equal to the third voltage threshold, a voltage difference between two ends of a contact of the active protection switch is large. As a result, arcing may occur when the active protection switch is turned off, and the contact of the active protection switch is stuck. Consequently, the active protection switch cannot be successfully turned off. Therefore, when it is determined that the input voltage is greater than or equal to the third voltage threshold, the input voltage is decreased to be less than or equal to the first voltage threshold, and after the input voltage is decreased, the breaking instruction is delivered to control the active protection switch to be turned off. After the input voltage is decreased to the first voltage threshold, the voltage difference between the two ends of the contact of the active protection switch can be decreased, and arcing energy is decreased, so that the active protection switch can be smoothly turned off.

In an implementation of the first aspect, the photovoltaic system includes a current sensor. The current sensor is configured to: detect the reverse current of the photovoltaic unit, and send a magnitude of the reverse current to the controller; and/or the photovoltaic system includes a voltage sensor, and the voltage sensor is configured to: detect the input voltage of the direct current-direct current conversion circuit, and send a detection result to the controller. In this solution, the circuit design can be simplified by using the sensor.

In an implementation of the first aspect, the load includes a direct current-alternating current conversion circuit, and the direct current-alternating current conversion circuit is connected to the output of the direct current-direct current conversion circuit and a power grid. The photovoltaic system in this solution may be connected to the power grid. Because the photovoltaic system can reliably eliminate the reverse current, a fault in the photovoltaic system can be prevented from spreading to the power grid.

According to a second aspect, the embodiments provide a circuit protection method for a photovoltaic system. The photovoltaic system includes an active protection switch, a direct current-direct current conversion circuit, and a controller. One end of the active protection switch is configured to connect to a photovoltaic module, the other end is connected to an input of the direct current-direct current conversion circuit, an output of the direct current-direct current conversion circuit is configured to connect to a load, and the circuit protection method includes: when the reverse current of the photovoltaic module is greater than or equal to a current threshold, delivering a breaking instruction to the active protection switch based on an input voltage of the direct current-direct current conversion circuit, where the breaking instruction is used to trigger the active protection switch to be turned off; and when the active protection switch is not effectively turned off within preset duration after the breaking instruction is delivered to the active protection switch, regulating the input voltage of the direct current-direct current conversion circuit to be less than or equal to a first voltage threshold.

In the circuit protection method in this solution, when the reverse current is detected, a fault scenario can be further determined by using the input voltage of the direct current-direct current conversion circuit. After the fault scenario is determined, circuit protection can be performed by disconnecting active protection. When it is detected that the active protection switch fails to be turned off, the reverse current in the photovoltaic system can be eliminated by using a further protection measure in which the input voltage of the direct current-direct current conversion circuit is decreased, to avoid burning and fault spreading in the photovoltaic system. This improves safety and reliability of the photovoltaic system.

In an implementation of the second aspect, "detecting that the active protection switch is not effectively turned off" includes: detecting that a current of the direct current-direct current conversion circuit is greater than or equal to a critical value. In this solution, whether the active protection switch is effectively turned off may be determined by detecting the current of the direct current-direct current conversion circuit. This has a simple design, facilitates mass production, and has high reliability.

In an implementation of the second aspect, "detecting that the active protection switch is not effectively turned off" includes: regulating the input voltage of the direct current-direct current conversion circuit to be greater than 0 and less than or equal to the first voltage threshold; and detecting that the current of the direct current-direct current conversion circuit is greater than or equal to the critical value.

In this solution, the input voltage is controlled to be greater than 0 and less than or equal to the first voltage threshold, so that the direct current-direct current conversion circuit is in a state that is close to a short circuit but is not short-circuited. Whether the active protection switch is effectively turned off can be detected, and an output voltage of the direct current-direct current conversion circuit can be maintained at a specific value, to power the load in a photovoltaic inverter (the load may include a heat dissipation apparatus, and the heat dissipation apparatus can be driven by electric energy to operate, to maintain heat dissipation performance of the photovoltaic inverter), so that the photovoltaic inverter does not need to be additionally powered. This can simplify the design, and reduce costs.

In an implementation of the second aspect, "detecting that the active protection switch is not effectively turned off" includes: controlling a switching component of the direct current-direct current conversion circuit to keep normally on; and detecting that the current of the direct current-direct current conversion circuit is greater than or equal to the critical value. Determining logic of this solution is simple. This facilitates the mass production, and has the high reliability.

In an implementation of the second aspect, "detecting that the active protection switch is not effectively turned off" includes: detecting that a contact position feedback signal generated by the active protection switch is a target signal. A circuit design and the determining logic of this solution are simple. This facilitates the mass production, and has the high reliability.

In an implementation of the second aspect, "detecting that the active protection switch is not effectively turned off" includes: detecting that the input voltage of the direct current-direct current circuit is greater than or equal to a second voltage threshold. In this solution, whether the active protection switch is effectively turned off may be determined by detecting the input voltage of the direct current-direct current conversion circuit. This has the simple design, facilitates the mass production, and has the high reliability.

In an implementation of the second aspect, "regulating the input voltage of the direct current-direct current conversion circuit to be less than or equal to the first voltage threshold" includes: regulating the input voltage of the direct current-direct current conversion circuit to be greater than 0 and less than or equal to the first voltage threshold.

In this solution, the input voltage is controlled to be greater than 0 and less than or equal to the first voltage threshold, so that the direct current-direct current conversion circuit is in the state that is close to the short circuit but is not short-circuited. The reverse current flowing through the photovoltaic module can be decreased, and the output voltage of the direct current-direct current conversion circuit can be maintained at the specific value, to power the load in the photovoltaic inverter (the load may include the heat dissipation apparatus, and the heat dissipation apparatus can be driven by electric energy to operate, to maintain the heat dissipation performance of the photovoltaic inverter), so that the photovoltaic inverter does not need to be additionally powered. This can simplify the design, and reduce the costs.

In an implementation of the second aspect, "regulating the input voltage of the direct current-direct current conversion circuit to be greater than 0 and less than or equal to the first voltage threshold" includes: controlling the direct current-direct current conversion circuit to generate a target output voltage, to enable the input voltage of the direct current-direct current conversion circuit to be greater than 0 and less than or equal to the first voltage threshold. In this solution, the output voltage of the direct current-direct current conversion circuit is controlled, to regulate the input voltage of the direct current-direct current conversion circuit. This has the simple design, and facilitates the mass production.

In an implementation of the second aspect, "regulating the input voltage of the direct current-direct current conversion circuit to be less than or equal to the first voltage threshold" includes: controlling the switching component of the direct current-direct current conversion circuit to keep normally on. In this solution, the direct current-direct current conversion circuit may be in a short-circuit state, and the input voltage of the direct current-direct current conversion circuit may be decreased to 0. In this solution, the direct current-direct current conversion circuit is in the short-circuit state, so that a reverse current flowing through a photovoltaic unit can be decreased.

In an implementation of the second aspect, "delivering a breaking instruction to the active protection switch based on an input voltage of the direct current-direct current conversion circuit" includes: detecting whether the input voltage of the direct current-direct current conversion circuit is greater than or equal to a fourth voltage threshold; and when the input voltage is less than the fourth voltage threshold, delivering the breaking instruction to the active protection switch; or when the input voltage is greater than or equal to the fourth voltage threshold, and it is detected that the reverse current is greater than the current threshold after specified duration, delivering the breaking instruction to the active protection switch.

In this solution, the fault scenario may be determined based on the reverse current and the input voltage. When the input voltage is less than the fourth voltage threshold, that a reverse polarity connection fault occurs may be determined. In this case, the breaking instruction is delivered to the active protection switch to perform a breaking protection action, to decrease the reverse current. When the input voltage is greater than or equal to the fourth voltage threshold, that an open-circuit voltage inconsistency fault occurs may be determined. In this case, waiting duration may be determined, and the reverse current is continuously detected within the waiting duration. If it is detected that the reverse current still does not disappear after the waiting duration, the breaking protection action is performed. In this solution, different fault scenarios can be identified based on the reverse current and the input voltage, and different protection actions are performed for the different fault scenarios.

In an implementation of the second aspect, "delivering the breaking instruction to the active protection switch" includes: detecting whether the input voltage of the direct current-direct current conversion circuit is greater than or equal to a third voltage threshold, where the third voltage threshold is greater than the first voltage threshold; and when the input voltage is greater than or equal to the third voltage threshold, regulating the input voltage of the direct current-direct current conversion circuit to be less than or equal to the first voltage threshold, and delivering the breaking instruction to the active protection switch; or when the input voltage is less than the third voltage threshold, delivering the breaking instruction to the active protection switch.

In this solution, when the controller determines that the input voltage is greater than or equal to the third voltage threshold, a voltage difference between two ends of a contact of the active protection switch is large. As a result, arcing may occur when the active protection switch is turned off, and the contact of the active protection switch is stuck. Consequently, the active protection switch cannot be successfully turned off. Therefore, when it is determined that the input voltage is greater than or equal to the third voltage threshold, the input voltage is decreased to be less than or equal to the first voltage threshold, and after the input voltage is decreased, the breaking instruction is delivered to control the active protection switch to be turned off. After the input voltage is decreased to the first voltage threshold, the voltage difference between the two ends of the contact of the active protection switch can be decreased, and arcing energy is decreased, so that the active protection switch can be smoothly turned off.

DETAILED DESCRIPTION OF EMBODIMENTS

"First", "second", and various numbers in embodiments are merely used for differentiation for ease of description, and are not construed as a limitation or limitations to the scope of the embodiments. The term "and/or" describes only an association relationship for describing associated objects and represents that three relationships may exist. For example, A and/or B may represent the following three cases: only A exists, both A and B exist, and only B exists.

A photovoltaic system is a power generation system in which solar energy is directly converted into electrical energy by using a photovoltaic module, and includes a photovoltaic string, a battery, a controller, a photovoltaic inverter, and the like. The photovoltaic module is a smallest indivisible photovoltaic cell combination apparatus that can independently provide a direct current output. The photovoltaic string includes a plurality of photovoltaic modules that are combined in series or/and in parallel.

Figure 1:
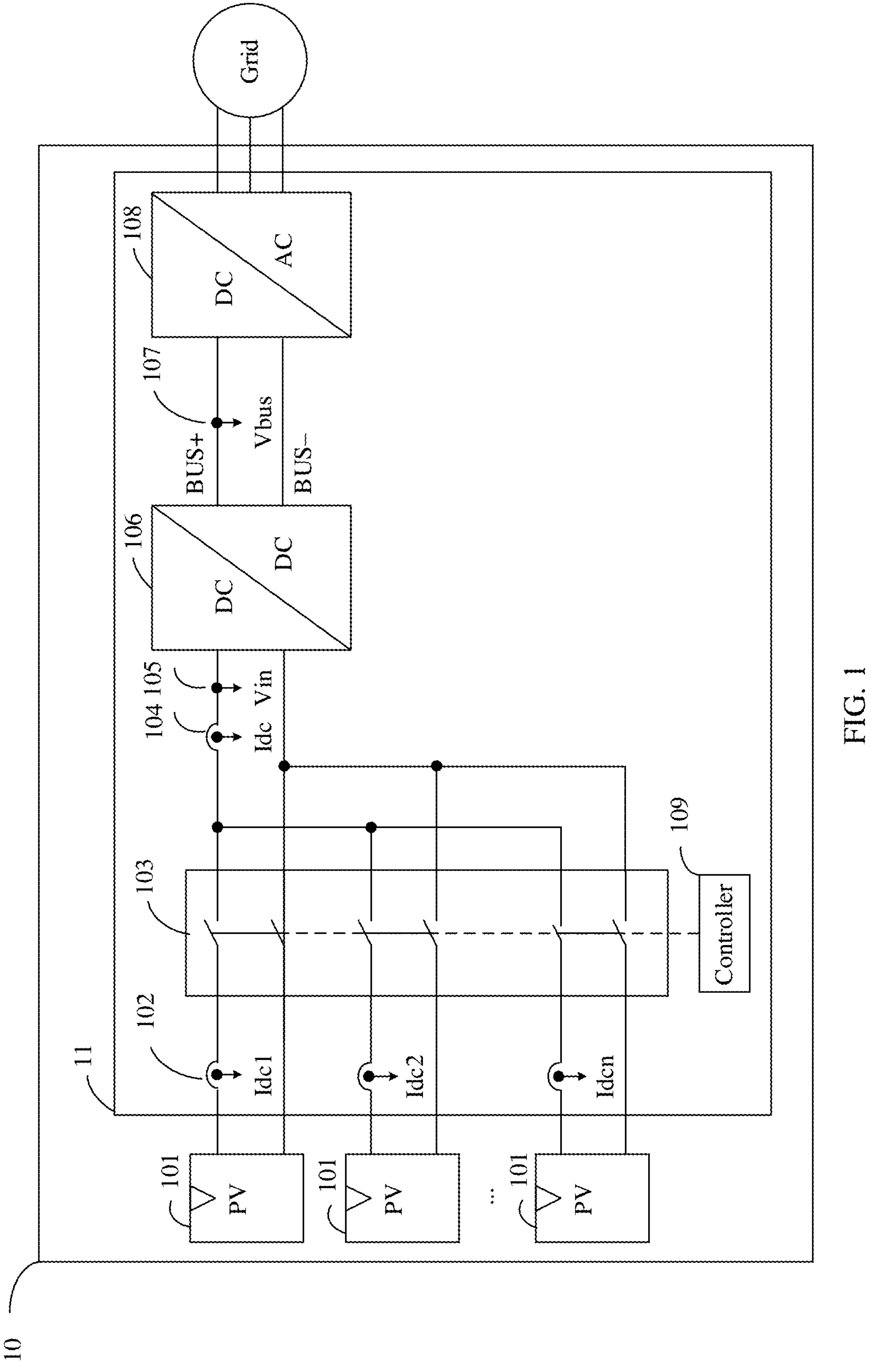
FIG. 1 is a schematic of a structure of a circuit framework of a photovoltaic system according to an embodiment.

FIG. 1 shows a frame structure of a photovoltaic system 10 according to an embodiment. As shown in FIG. 1, the photovoltaic system 10 may include several photovoltaic units 101 and a photovoltaic inverter 11, and the several photovoltaic units 101 are connected in parallel to the photovoltaic inverter 11. The photovoltaic inverter 11 may include several branch current sensors 102, an active protection switch 103, a combined current sensor 104, an input voltage sensor 105, a direct current-direct current (DC-DC) conversion circuit 106, an output voltage sensor 107, a direct current-alternating current (DC-AC) conversion circuit 108, and a controller 109. In another embodiment, the photovoltaic inverter 11 may alternatively be considered as a photovoltaic system, the photovoltaic unit 101 may not be a device in the photovoltaic system 10, and the photovoltaic unit 101 is connected to the photovoltaic system (the photovoltaic inverter 11). The photovoltaic unit 101 may be formed by connecting photovoltaic modules in series or in parallel. In this figure, photovoltaic units 101 are connected in parallel. In some embodiments, the photovoltaic units 101 may alternatively be connected in series. A specific connection manner of the photovoltaic units 101 is not a specific implementation of the embodiments. A person skilled in the art may perform series-parallel combination of a plurality of photovoltaic modules based on an input requirement of the photovoltaic inverter 11, to obtain a required input voltage.

As shown in FIG. 1, the photovoltaic unit 101 may be marked as PV. The photovoltaic unit 101 may be the foregoing photovoltaic string, or may be a photovoltaic array formed by connecting several photovoltaic strings in series and in parallel, or may be a single photovoltaic module in some implementations. A quantity of photovoltaic units 101 may be configured as required, and may be at least one. FIG. 1 schematically shows a plurality of photovoltaic units 101, and the plurality of photovoltaic units 101 are connected in parallel to form a plurality of branches.

As shown in FIG. 1, each photovoltaic unit 101 is connected in series to the active protection switch 103, and the other end of the active protection switch 103 and an input of the direct current-direct current conversion circuit 106 are connected in parallel, so that the plurality of photovoltaic units 101 are all connected to the input of the direct current-direct current conversion circuit 106 by using the active protection switch 103.

For example, there may be only one active protection switch 103. A moving mechanism and a plurality of contacts are disposed in the active protection switch 103. One photovoltaic unit 101 is correspondingly connected to a group of contacts in the active protection switch 103. The moving mechanism may control the plurality of contacts to operate simultaneously, so that all the photovoltaic units 101 are simultaneously connected to or disconnected from the active protection switch 103. The active protection switch 103 has active breaking performance, and can actively disconnect a circuit based on information such as a current and a voltage. The active protection switch 103 may be, for example, a direct current trip switch or a direct current circuit breaker.

As shown in FIG. 1, a quantity of branch current sensors 102 is consistent with the quantity of photovoltaic units 101, and one photovoltaic unit 101 may correspond to one branch current sensor 102. The branch current sensor 102 may be connected in series to the photovoltaic unit 101, and is disposed in a branch in which the photovoltaic unit 101 is located. For example, the branch current sensor 102 may be disposed between a parallel connection point (that is, a parallel connection position of the plurality of contacts of the active protection switch 103, where the parallel connection point is connected to the input of the direct current-direct current conversion circuit 106) of the active protection switch 103 and the photovoltaic unit 101. The branch current sensor 102 is configured to detect a current (which may be referred to as a current of a branch) of the photovoltaic unit 101 connected in series to the branch current sensor 102. Currents of branches detected by the branch current sensors 102 may be sequentially marked as Idc1, Idc2, . . . , and Idcn.

As shown in FIG. 1, the combined current sensor 104 and the parallel connection point of the active protection switch 103 may be connected in series, and the combined current sensor 104 may be located between the parallel connection point and the direct current-direct current conversion circuit 106. The combined current sensor 104 is configured to detect a total current (which may be referred to as a combined current) obtained after all the photovoltaic units 101 are connected in parallel. The combined current detected by the combined current sensor 104 may be marked as Idc.

As shown in FIG. 1, the input voltage sensor 105 may be located at the input of the direct current-direct current conversion circuit 106, for example, located between the parallel connection point of the active protection switch 103 and the direct current-direct current conversion circuit 106. The input voltage sensor 105 is configured to detect an input voltage of the direct current-direct current conversion circuit 106. The input voltage detected by the input voltage sensor 105 may be marked as Vin. The input voltage is also equal to a voltage at two ends of the photovoltaic unit 101 of each branch.

As shown in FIG. 1, the output voltage sensor 107 may be located at an output of the direct current-direct current conversion circuit 106, and is configured to detect an output voltage of the direct current-direct current conversion circuit 106. The output of the direct current-direct current conversion circuit 106 may be connected to the direct current-alternating current conversion circuit 108 through a direct current bus (marked as BUS). Therefore, the output voltage detected by the output voltage sensor 107 may be marked as Vbus.

In this embodiment, the direct current-direct current conversion circuit 106 may be an independent device. For example, the direct current-direct current conversion circuit 106 may be a DC-DC converter. Alternatively, the direct current-direct current conversion circuit 106 may be a circuit module in the system.

As shown in FIG. 1, the direct current-alternating current conversion circuit 108 may be connected to the output of the direct current-direct current conversion circuit 106 and an alternating current power grid. Therefore, the photovoltaic system 10 may input converted electric energy into the alternating current power grid.

For the direct current-direct current conversion circuit 106, both the direct current-alternating current conversion circuit 108 and the alternating current power grid may be referred to as alternating current loads. In other words, the output of the direct current-direct current conversion circuit 106 is connected to the alternating current load. In this embodiment, in addition to the alternating current load described above, the load may alternatively be a direct current load like another DC-DC conversion device or an energy storage device (for example, a battery). Therefore, in summary, the output of the direct current-direct current conversion circuit 106 is connected to the load, and loads include, but are not limited to, the alternating current loads such as the direct current-alternating current conversion circuit 108 and the alternating current power grid, and the direct current loads such as the another DC-DC conversion device and the energy storage device.

In this embodiment, the direct current-alternating current conversion circuit 108 may be an independent device. For example, the direct current-alternating current conversion circuit 108 may be a DC-AC converter. Alternatively, the direct current-alternating current conversion circuit 108 may be a circuit module in the system.

In this embodiment, the direct current-direct current conversion circuit 106 and the direct current-alternating current conversion circuit 108 may be used as components of the photovoltaic inverter. The photovoltaic inverter is of a dual-stage architecture, the direct current-direct current conversion circuit 106 is a pre-stage circuit, and the direct current-alternating current conversion circuit 108 is a post-stage circuit. In another embodiment, the photovoltaic system may not include the direct current-alternating current conversion circuit 108. For example, when the direct current-direct current conversion circuit 106 is connected to the direct current load, the photovoltaic system may not include the direct current-alternating current conversion circuit 108. There is no photovoltaic inverter in the photovoltaic system that does not include the direct current-alternating current conversion circuit 108.

As shown in FIG. 1, the controller 109 may be electrically connected to the branch current sensors 102, the active protection switch 103, the combined current sensor 104, the input voltage sensor 105, the direct current-direct current conversion circuit 106, and the output voltage sensor 107, to obtain signals detected by the branch current sensors 102, the active protection switch 103, the combined current sensor 104, the input voltage sensor 105, the direct current-direct current conversion circuit 106, and the output voltage sensor 107, determine operating statuses of the branch current sensors 102, the active protection switch 103, the combined current sensor 104, the input voltage sensor 105, the direct current-direct current conversion circuit 106, and the output voltage sensor 107, control the branch current sensors 102, the active protection switch 103, the combined current sensor 104, the input voltage sensor 105, the direct current-direct current conversion circuit 106, and the output voltage sensor 107 to operate, and the like. The controller 109 can coordinate the components to operate based on a function requirement of an instruction, and is a nerve center and a command center of the photovoltaic system 10 (which is further described below).

In an embodiment, the controller 109 may include components such as an instruction register (IR), a program counter (PC), and an operation controller (OC). The controller 109 may be one or more devices, circuits, and/or processing cores configured to process data (for example, computer program instructions).

In another embodiment, the controller 109 may be a processor, or may be a general term of a plurality of processing elements. The processor may be a general-purpose central processing unit (CPU), or may be an application-specific integrated circuit (ASIC). Alternatively, the processor may be one or more integrated circuits configured to control program execution of the solutions, for example, one or more microprocessors (DSP), or one or more field programmable gate arrays (FPGA).

In the foregoing embodiment, sensors such as the branch current sensor 102, the combined current sensor 104, the input voltage sensor 105, and the output voltage sensor 107 are used, so that a sensor having a corresponding sampling current range or sampling voltage range is flexibly selected based on a specification of PV. In this way, the photovoltaic system 10 can be flexibly deployed and constructed. In another embodiment, a sampling circuit may alternatively be disposed in the controller, to implement sampling functions of the sensors such as the branch current sensor 102, the combined current sensor 104, the input voltage sensor 105, and the output voltage sensor 107. In this case, the sensors such as the branch current sensor 102, the combined current sensor 104, the input voltage sensor 105, and the output voltage sensor 107 do not need to be additionally disposed. This solution can simplify the circuit.

In the foregoing embodiment, the photovoltaic inverter 11 includes the branch current sensor 102, the active protection switch 103, the combined current sensor 104, the input voltage sensor 105, the direct current-direct current conversion circuit 106, the output voltage sensor 107, the direct current-alternating current conversion circuit 108, and the controller 109. This is merely an example. In another embodiment, the photovoltaic inverter may include the direct current-direct current conversion circuit and the direct current-alternating current conversion circuit. However, at least one of the branch current sensor 102, the active protection switch 103, the combined current sensor 104, the input voltage sensor 105, the output voltage sensor 107, and the controller 109 is not disposed in the photovoltaic inverter. In other words, the at least one of the branch current sensor 102, the active protection switch 103, the combined current sensor 104, the input voltage sensor 105, the output voltage sensor 107, and the controller 109 may be independent of the photovoltaic inverter.

The foregoing describes a structure of a circuit frame of the photovoltaic system 10, and the following describes in detail an operating principle of the photovoltaic system 10.

When the photovoltaic units 101 in the photovoltaic system 10 operate, because a photovoltaic unit 101 in a branch is faulty, currents of photovoltaic units 101 in other normal branches flow to the photovoltaic unit 101 in the faulty branch. Consequently, a reverse current occurs in the faulty branch. If the reverse current does not exceed a current threshold, because the photovoltaic unit 101 has a specific current withstand capability, no protection action may be needed. If the reverse current is greater than or equal to the current threshold, the protection action needs to be taken to prevent the photovoltaic unit 101 from being burnt.

Refer to FIG. 1. The branch current sensor 102 may detect a current of the photovoltaic unit 101, and send a detection result to the controller 109. The controller 109 may determine whether the reverse current is greater than or equal to the current threshold by determining the detection result.

Depending on the embodiment, there are two types of faults that may cause a large reverse current. One is a reverse polarity connection of the photovoltaic unit 101, and the other is open-circuit voltage inconsistency of the photovoltaic units 101. Descriptions are separately provided below.

Figure 2:
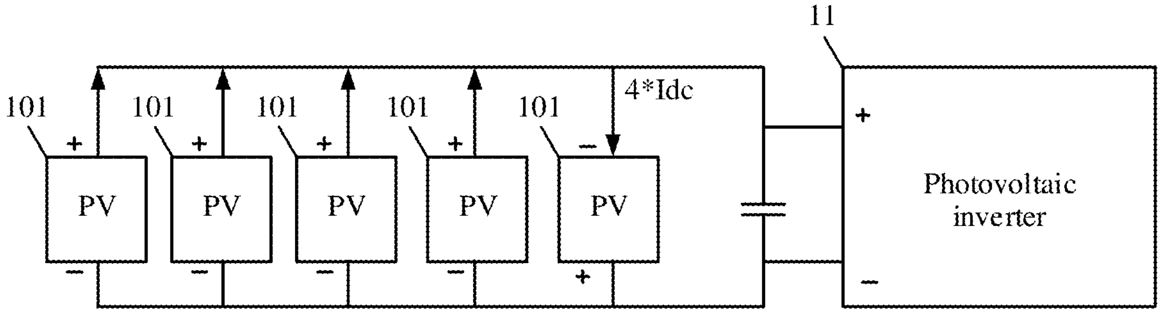
FIG. 2 is a schematic of a structure of a circuit framework indicating a reverse polarity connection fault.

FIG. 2 shows a fault scenario in which a large reverse current is caused by the reverse polarity connection of the photovoltaic unit 101. A circuit connection between five photovoltaic units 101 and the photovoltaic inverter 11 is schematically shown. As shown in FIG. 2, the five photovoltaic units 101 and the photovoltaic inverter 11 are connected in parallel, and polarities of first four photovoltaic units 101 are correctly connected to polarities of the photovoltaic inverter 11 (a positive electrode is connected to a positive electrode, and a negative electrode is connected to a negative electrode). Polarities of a fifth photovoltaic unit 101 are reversely connected to the polarities of the photovoltaic inverter 11 (a negative electrode is connected to the positive electrode, and a positive electrode is connected to the negative electrode). A current of each of the first four photovoltaic units 101 is marked as Idc. Because the polarities of the fifth photovoltaic unit 101 are reversely connected, the fifth photovoltaic unit 101 is short-circuited. Therefore, currents of the first four photovoltaic units 101 all flow into the fifth photovoltaic unit 101 (the currents are referred to as a reverse current, and the reverse current may be 4*Idc), and do not flow into the photovoltaic inverter 11 (this phenomenon is referred to as current backflow). Therefore, a current direction of the fifth photovoltaic unit 101 is opposite to current directions of the first four photovoltaic units 101, and a current of the fifth photovoltaic unit 101 is large. This is a reverse current fault caused by the reverse polarity connection.

For the reverse current fault caused by the reverse polarity connection, with reference to FIG. 1, the input voltage detected by the input voltage sensor 105 is small.

Figure 3:
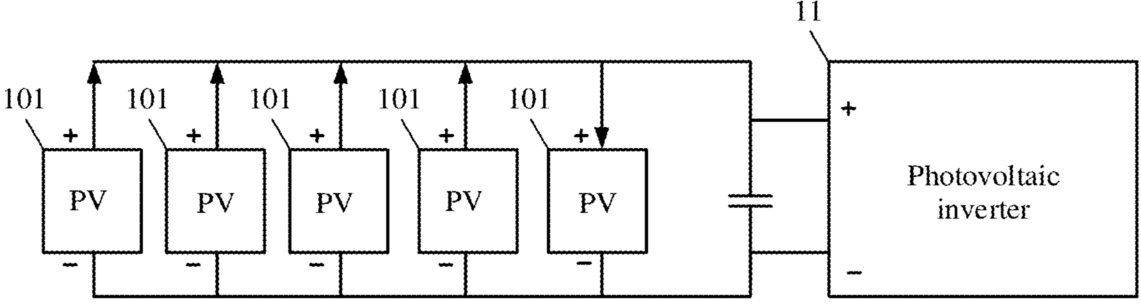
FIG. 3 is a schematic of a structure of a circuit frame indicating an open-circuit voltage inconsistency fault.

FIG. 3 shows a fault scenario in which a large reverse current is caused by open-circuit voltage inconsistency of the photovoltaic units 101. A circuit connection between five photovoltaic units 101 and the photovoltaic inverter 11 is schematically shown. As shown in FIG. 3, the five photovoltaic units 101 and the photovoltaic inverter 11 are connected in parallel, and polarities of each photovoltaic unit 101 are correctly connected to polarities of the photovoltaic inverter 11. However, quantities of photovoltaic units connected in series in first four photovoltaic units 101 are the same, so that open-circuit voltages of the first four photovoltaic units 101 are consistent (the open-circuit voltage is a voltage obtained when a branch is open-circuited and does not output a current). A quantity of photovoltaic units connected in series in a fifth photovoltaic unit 101 is less than a quantity of photovoltaic units connected in series in another photovoltaic unit 101. In other words, the quantity of photovoltaic units connected in series in the fifth photovoltaic unit 101 is the smallest. As a result, currents of the photovoltaic units 101 of first four branches flow into the fifth photovoltaic unit 101 (the currents are referred to as a reverse current, and the reverse current may depend on a difference between the open-circuit voltages of the photovoltaic units 101 of the first four branches and an open-circuit voltage of the fifth photovoltaic unit 101), and do not flow into the photovoltaic inverter 11 (a current backflow phenomenon occurs). Therefore, a current direction of the fifth photovoltaic unit 101 is opposite to current directions of the first four photovoltaic units 101, and a current of the fifth photovoltaic unit 101 is large. This is a reverse current fault caused by the open-circuit voltage inconsistency.

For the reverse current fault caused by the open-circuit voltage inconsistency, with reference to FIG. 1, the input voltage detected by the input voltage sensor 105 is large. Therefore, for the reverse current fault caused by the reverse polarity connection and the reverse current fault caused by the open-circuit voltage inconsistency, the input voltage corresponding to the previous fault is smaller than the input voltage corresponding to the next fault.

The photovoltaic system 10 in this embodiment can detect the reverse current, determine a fault scenario corresponding to the reverse current, and separately perform corresponding actions for different fault scenarios, to decrease or eliminate the reverse current, prevent the faulty photovoltaic unit 101 from being burnt, and prevent fault spreading. Thus, safety and reliability of the photovoltaic system are improved. The following provides detailed descriptions.

Figure 4:
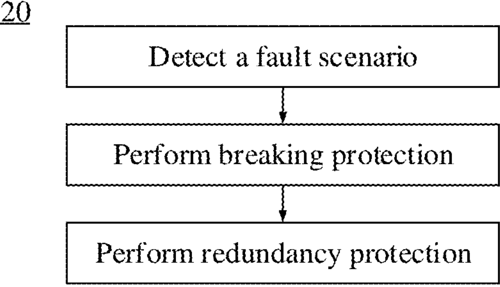
FIG. 4 is an overall block flowchart of a circuit protection method according to an embodiment.

As shown in FIG. 4, an embodiment provides a circuit protection method 20 for a photovoltaic system, which may be applied to the photovoltaic system 10. The circuit protection method 20 may include the following function parts: detecting a fault scenario, performing breaking protection, and performing redundancy protection. The following separately provides detailed descriptions.

Figures 5, 6:
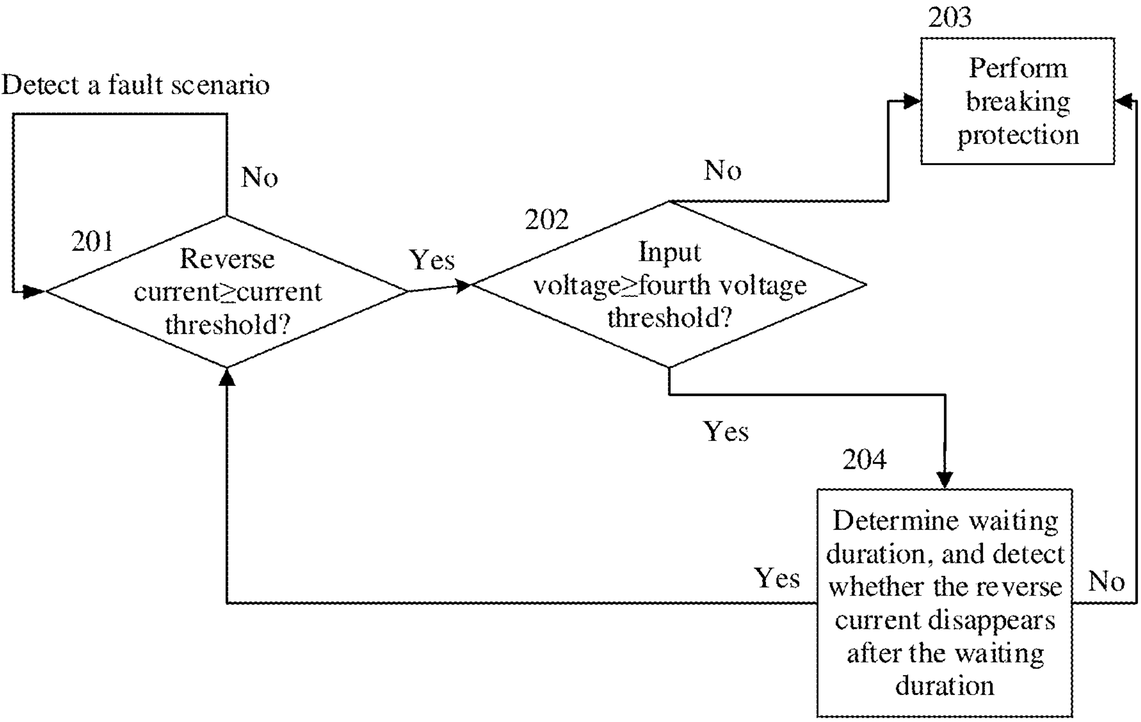
FIG. 5 is a block flowchart of a part of detecting a fault scenario in the circuit protection method in FIG. 4.
FIG. 6 is a block flowchart of a part of performing breaking protection in the circuit protection method in FIG. 4.

FIG. 5 may be a block flowchart of the part of detecting a fault scenario. As shown in FIG. 5, the part of detecting a fault scenario may include the following steps:

201: Detect whether a reverse current is greater than or equal to a current threshold.

When the reverse current is less than the current threshold, the process returns to step 201 for execution. When the reverse current is greater than or equal to the current threshold, step 202 is performed.

202: Detect whether an input voltage of a direct current-direct current conversion circuit is greater than or equal to a fourth voltage threshold.

When the input voltage is less than the fourth voltage threshold, step 203 is performed. When the input voltage is greater than or equal to the fourth voltage threshold, step 204 is performed.

203: Perform breaking protection.

204: Determine waiting duration, and detect whether the reverse current is greater than or equal to the current threshold.

When it is detected that the reverse current is less than the current threshold after the waiting duration, step 201 is performed. When it is detected that the reverse current is greater than or equal to the current threshold after the waiting duration, step 203 is performed.

In step 201, with reference to FIG. 1, the controller 109 may control the branch current sensors 102 to detect the currents of the branches, and determine, based on detection results of the branch current sensors 102, whether the reverse current greater than or equal to the current threshold occurs in the branches. The current threshold may be determined based on a current withstand capability of the photovoltaic unit 101. For example, the current threshold may be less than or equal to a current withstand value of the photovoltaic unit 101. As shown in FIG. 5, when a determining result of step 201 is yes, it indicates that a fault that requires a protection action occurs in a branch. When the determining result of step 201 is no, it indicates that there is no reverse current or the reverse current does not exceed the current withstand value, and the protection action does not need to be performed immediately.

With reference to FIG. 1, when detecting the reverse current greater than or equal to the current threshold, the controller 109 may control the input voltage sensor 105 to detect the input voltage of the direct current-direct current conversion circuit 106, and determine, based on a detection result of the input voltage sensor 105, whether the input voltage is greater than or equal to the fourth voltage threshold. The fourth voltage threshold may be determined based on a configuration status of the photovoltaic unit 101, and may be equal to an upper limit of a voltage presented to the outside when the photovoltaic unit 101 generates the reverse current. As described above, the open-circuit voltage inconsistency corresponds to the large input voltage, and the reverse polarity connection corresponds to the small input voltage. Therefore, when a determining result of step 202 is yes, it indicates that the fault is the open-circuit voltage inconsistency, and step 204 is performed. If the determining result of step 202 is no, it indicates that the fault is the reverse polarity connection, and step 203 is performed.

In step 203, with reference to FIG. 1, after the controller 109 determines that the fault scenario is the reverse polarity connection, the controller 109 may perform a breaking protection action. The following continues to describe performing the breaking protection action.

In step 204, with reference to FIG. 1, after the controller 109 determines that the fault scenario is the open-circuit voltage inconsistency, the controller 109 may determine the waiting duration, and continuously detect the reverse current in the waiting duration. The controller 109 may calculate the waiting duration based on a built-in policy. Based on the policy, the large reverse current may correspond to short waiting duration, and the small reverse current may correspond to long waiting duration. If detecting that the reverse current still does not disappear after the waiting duration, the controller 109 performs the breaking protection action. If the controller 109 detects that the reverse current disappears after the waiting time, the process returns to step 201. The reverse current may disappear when a voltage of the photovoltaic system 10 obtained when the photovoltaic system 10 operates in a grid-connected manner decreases to a maximum power point tracking (MPPT) window (in a P-V curve, a voltage range corresponding to a maximum power point is determined, and the voltage range may be referred to as the MPPT window), or after shadow that shields the photovoltaic unit 101 disappears.

It can be understood from the foregoing description that, in the part of detecting a fault scenario in the circuit protection method 20, different fault scenarios can be identified based on the reverse current and the input voltage, and different protection actions are performed for the different fault scenarios.

FIG. 6 may be a block diagram of the part of performing breaking protection. As shown in FIG. 6, the part of performing breaking protection may include the following steps:

301: Detect whether an input voltage of a direct current-direct current conversion circuit is greater than or equal to a third voltage threshold, where the third voltage threshold is greater than a first voltage threshold.

When the input voltage is greater than or equal to the third voltage threshold, step 302 is performed, and step 303 is performed. When the input voltage is less than the third voltage threshold, step 303 is performed.

302: Decrease the input voltage to be less than or equal to the first voltage threshold. Step 303: Deliver a breaking instruction.

If the input voltage of the direct current-direct current conversion circuit 106 is excessively large, a voltage difference between two ends of a contact of the active protection switch 103 is large. This may cause an occurrence of arcing when the active protection switch 103 is turned off. Arcing energy may cause the contact of the active protection switch 103 to stick, and consequently the active protection switch 103 cannot be successfully turned off. Therefore, in the solution in this embodiment, the input voltage is detected, and a corresponding protection action is performed based on a detection result. The following provides descriptions.

In step 301, with reference to FIG. 1, the controller 109 may control the input voltage sensor 105 to detect the input voltage of the direct current-direct current conversion circuit 106, and determine, based on a detection result of the input voltage sensor 105, whether the input voltage is greater than or equal to the third voltage threshold. The third voltage threshold is related to a specification of the active protection switch 103, and may be determined based on a breaking capability of the active protection switch 103. For example, the third voltage threshold may be equal to an upper operating voltage limit of the active protection switch 103. The third voltage threshold is unrelated to the fourth voltage threshold, and the third voltage threshold may be greater than the first voltage threshold to be described below.

With reference to FIG. 1, when determining that the input voltage is greater than or equal to the third voltage threshold, the controller 109 decreases the input voltage to be less than or equal to the first voltage threshold, and after the input voltage is decreased, the breaking instruction is delivered to control the active protection switch 103 to be turned off. The first voltage threshold may be determined based on the configuration status of the photovoltaic unit 101. For example, the first voltage threshold may be less than, equal to, or greater than a lower limit of the voltage presented to the outside when the photovoltaic unit 101 generates the reverse current. For example, a difference between the first voltage threshold and the lower limit may be small. The first voltage threshold is less than the third voltage threshold. In this embodiment, after the input voltage is decreased to the first voltage threshold, the voltage difference between the two ends of the contact of the active protection switch 103 can be decreased, and the arcing energy is decreased, so that the active protection switch 103 can be smoothly turned off.

With reference to FIG. 1, when determining that the input voltage is less than the third voltage threshold, the controller 109 may directly deliver the breaking instruction, to control the active protection switch 103 to be turned off.

It can be understood from the foregoing description that, in the part of performing breaking protection in the circuit protection method 20, after the fault scenario is determined, the active protection switch 103 can be controlled to be turned off, to cut off a direct current energy input, eliminate the reverse current, and prevent fault spreading. Thus, the safety and the reliability of the photovoltaic system are improved.

In this embodiment, if the active protection switch 103 cannot cut off the circuit due to a mechanical failure or the like, the circuit protection method 20 may continue to perform redundancy protection, to ensure that the fault is eliminated.

Figure 7:
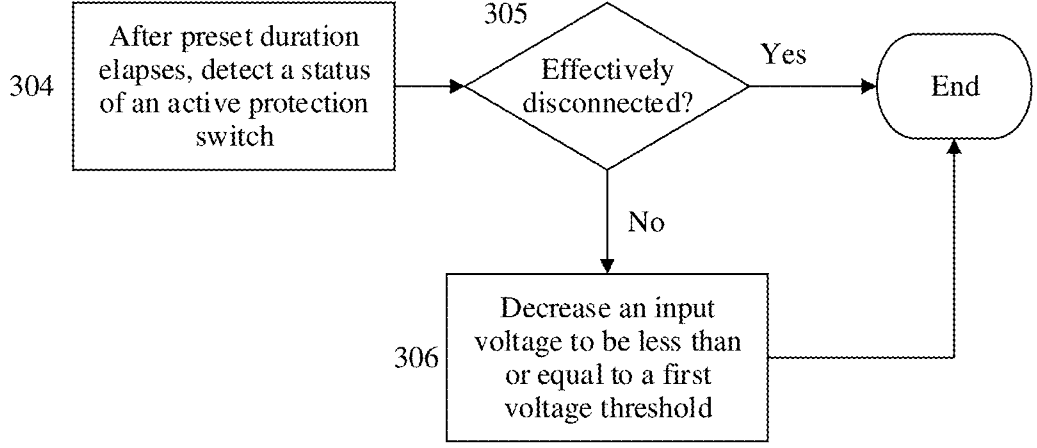
FIG. 7 is a block flowchart of a part of performing redundancy protection in the circuit protection method in FIG. 4.

FIG. 7 may be a block diagram of the part of performing redundancy protection. As shown in FIG. 7, the part of performing redundancy protection may include the following steps:

304: After preset duration elapses after the breaking instruction is delivered, detect a status of the active protection switch.

305: Determine whether the active protection switch is effectively turned off.

306: When the active protection switch is not effectively turned off, decrease the input voltage of the direct current-direct current conversion circuit to be less than or equal to the first voltage threshold.

It takes specific time for the active protection switch 103 to perform the breaking action. Therefore, in step 304 and step 305, with reference to FIG. 1, after the preset duration, the controller 109 may determine, based on the status of the active protection switch 103, whether the active protection switch 103 is effectively turned off. For example, in this embodiment, the status of the active protection switch 103 may be determined in the following implementations.

In Implementation 1, the controller 109 may send a current control signal to the direct current-direct current conversion circuit 106, so that the direct current-direct current conversion circuit 106 generates a current. The current may continuously last for specific duration (that is, a current value is not zero at all time), or intermittently last for specific duration (that is, the current sometimes exists and sometimes does not exist, which is similar to a pulse). The current value of the current may be fixed or variable. The controller 109 may also detect the current of the direct current-direct current conversion circuit 106 by using the combined current sensor 104. When detecting that the current is greater than or equal to a critical value, the controller 109 determines that the active protection switch 103 is not effectively turned off. The critical value may be determined based on an actual situation. For example, the critical value may be a small non-zero value determined by considering drift of current detection precision.

A detection principle of Implementation 1 is as follows: if the active protection switch 103 is effectively turned off, the circuit is disconnected, the combined current sensor 104 cannot respond to the current control signal of the controller 109, and the current detected by the combined current sensor 104 is zero. On the contrary, if the active protection switch 103 is not effectively turned off, the circuit is connected, the combined current sensor 104 may respond to the current control signal of the controller 109, and the current detected by the combined current sensor 104 is positive. Therefore, when the controller 109 detects that the current is greater than or equal to the critical value, it indicates that the active protection switch 103 is not effectively turned off.

Alternatively, in Implementation 2, the controller 109 may decrease the input voltage of the direct current-direct current conversion circuit 106 to a level greater than 0 and less than or equal to the first voltage threshold. In this case, the input voltage may be small, so that the direct current-direct current conversion circuit 106 is close to a short circuit (but not a real or actual short circuit). For example, the controller 109 may control the direct current-direct current conversion circuit 106 to generate a target output voltage, so that the input voltage is greater than 0 and less than or equal to the first voltage threshold. The target output voltage may have any appropriate constant voltage value. The controller 109 may also detect a current of the direct current-direct current conversion circuit 106 by using the combined current sensor 104. When detecting that the current of the direct current-direct current conversion circuit 106 is greater than or equal to a critical value, the controller 109 determines that the active protection switch 103 is not effectively turned off. The critical value may be determined based on an actual situation. For example, the critical value may be a small non-zero value determined by considering drift of current detection precision. The critical value in Implementation 2 may be the same as the critical value in Implementation 1.

A detection principle of Implementation 2 is as follows: if the active protection switch 103 is effectively turned off, the circuit is disconnected, the combined current sensor 104 cannot respond to a control signal of the controller 109, and the current detected by the combined current sensor 104 is zero. On the contrary, if the active protection switch 103 is not effectively turned off, the circuit is connected, the combined current sensor 104 may respond to the control signal of the controller 109, and the current detected by the combined current sensor 104 is positive. Therefore, when the controller 109 detects that the current is greater than or equal to the critical value, it indicates that the active protection switch 103 is not effectively turned off.

Implementation 2 may be considered as an alternative solution of Implementation 1. A difference lies in that in Implementation 1, detection is implemented by controlling the current of the direct current-direct current conversion circuit 106, and in Implementation 2, detection is implemented by controlling the input voltage of the direct current-direct current conversion circuit 106. In Implementation 2, the input voltage is controlled to be greater than 0 and less than or equal to the first voltage threshold, so that the direct current-direct current conversion circuit 106 is in a state that is close to the short circuit but is not short-circuited. Whether the active protection switch 103 is effectively turned off can be detected, and the output voltage of the direct current-direct current conversion circuit 106 can be maintained at a specific value, to power the load in the photovoltaic inverter 11 (the load may include a heat dissipation apparatus, and the heat dissipation apparatus can be driven by electric energy to operate, to maintain heat dissipation performance of the photovoltaic inverter 11), so that the photovoltaic inverter 11 does not need to be additionally powered. This can simplify a design, and reduce costs.

Alternatively, in Implementation 3, the controller 109 may control a switching component in the direct current-direct current conversion circuit 106 to keep normally on. In this case, the direct current-direct current conversion circuit 106 may be in a short-circuit state. The controller 109 may detect a current of the direct current-direct current conversion circuit 106 by using the combined current sensor 104. When detecting that the current of the direct current-direct current conversion circuit 106 is greater than or equal to a critical value, the controller 109 determines that the active protection switch 103 is not effectively turned off. The critical value may be determined based on an actual situation. For example, the critical value may be a small positive value determined by considering drift of current detection precision. The critical value in Implementation 3 may be the same as the critical value in Implementation 1.

A detection principle of Implementation 3 is as follows: if the active protection switch 103 is effectively turned off, the circuit is disconnected, and the current detected by the combined current sensor 104 is zero. On the contrary, if the active protection switch 103 is not effectively turned off, the circuit is connected, and the combined current sensor 104 can detect the reverse current. Therefore, when the controller 109 detects that the current of the direct current-direct current conversion circuit 106 is greater than or equal to a critical value, it indicates that the active protection switch 103 is not effectively turned off.

Alternatively, in Implementation 4, the active protection switch 103 may have a contact position feedback function, and the active protection switch 103 can output a contact position feedback signal. For example, the contact position feedback signal may be a level signal, and may indicate a position of the contact in the active protection switch 103, to determine whether the active protection switch 103 is turned off. The controller 109 may detect the contact position feedback signal sent by the active protection switch 103, and determine, based on the contact position feedback signal, whether the active protection switch 103 is effectively turned off. For example, when the contact position feedback signal is at a high level (or a low level), the controller 109 may determine that the active protection switch 103 is in a turned-on state. When the contact position feedback signal is at the low level (or the high level), the controller 109 may determine that the active protection switch 103 is in a turned-off state. Alternatively, when a voltage of the contact position feedback signal is in a first range, the controller 109 may determine that the active protection switch 103 is in a turned-on state. When the voltage of the contact position feedback signal is in a second range, the controller 109 may determine that the active protection switch 103 is in a turned-off state. In Implementation 4, an operating status of the active protection switch 103 can be directly read, and detection is simple.

Alternatively, in Implementation 5, the controller 109 may detect the input voltage of the direct current-direct current conversion circuit 106, and when the input voltage is greater than or equal to a second voltage threshold, determine that the active protection switch 103 is not effectively turned off. The second voltage threshold may be determined based on the configuration status of the photovoltaic unit 101, for example, may be a smallest voltage at which the direct current-direct current conversion circuit 106 is started. The second voltage threshold is related to the direct current-direct current conversion circuit 106, and is not related to the foregoing voltage thresholds.

A detection principle of Implementation 5 is as follows: the direct current-direct current conversion circuit 106 can operate normally only when the input voltage of the direct current-direct current conversion circuit 106 reaches the smallest voltage. In other words, when the direct current-direct current conversion circuit 106 operates, it indicates that the direct current-direct current conversion circuit 106 has reached the smallest voltage. If it is detected that the input voltage of the direct current-direct current conversion circuit 106 is greater than or equal to the second voltage threshold, it indicates that the direct current-direct current conversion circuit 106 is normally started, and further indicates that the photovoltaic unit 101 is connected to an input side of the direct current-direct current conversion circuit 106. Therefore, the active protection switch 103 is not effectively turned off.

In step 306, when determining that the active protection switch 103 is not effectively turned off, the controller 109 may decrease the input voltage of the direct current-direct current conversion circuit 106 to be not higher than the first voltage threshold. In this case, the input voltage may be small, and the reverse current flows into the direct current-direct current conversion circuit 106, to shunt the reverse current, reduce or eliminate the reverse current flowing through the photovoltaic unit 101, and prevent the photovoltaic unit 101 from being burnt.

For example, step 306 may be implemented in the following implementation. The following provides descriptions.

In an implementation, when determining that the active protection switch 103 is not effectively turned off, the controller 109 may control the input voltage of the direct current-direct current conversion circuit 106 to be greater than 0 and less than or equal to the first voltage threshold. For example, the controller 109 may control the direct current-direct current conversion circuit 106 to generate the target output voltage, so that the input voltage of the direct current-direct current conversion circuit 106 is greater than 0 and less than or equal to the first voltage threshold. The target output voltage may have any appropriate constant voltage value. In this implementation, the input voltage is controlled to be greater than 0 and less than or equal to the first voltage threshold, so that the direct current-direct current conversion circuit 106 is in the state that is close to the short circuit but is not short-circuited. The reverse current flowing through the photovoltaic unit 101 can be decreased, and the output voltage of the direct current-direct current conversion circuit 106 can be maintained at the specific value, to power the load in the photovoltaic inverter 11 (the load may include the heat dissipation apparatus, and the heat dissipation apparatus can be driven by electric energy to operate, to maintain the heat dissipation performance of the photovoltaic inverter 11), so that the photovoltaic inverter 11 does not need to be additionally powered. This can simplify the design, and reduce the costs.

In another implementation, when determining that the active protection switch 103 is not effectively turned off, the controller 109 may control the switching component in the direct current-direct current conversion circuit 106 to keep normally on. In this case, the direct current-direct current conversion circuit 106 may be in the short-circuit state, and the input voltage of the direct current-direct current conversion circuit 106 may be decreased to 0. In this implementation, the direct current-direct current conversion circuit 106 is in the short-circuit state, so that the reverse current flowing through the photovoltaic unit 101 can be decreased.

Figure 8:
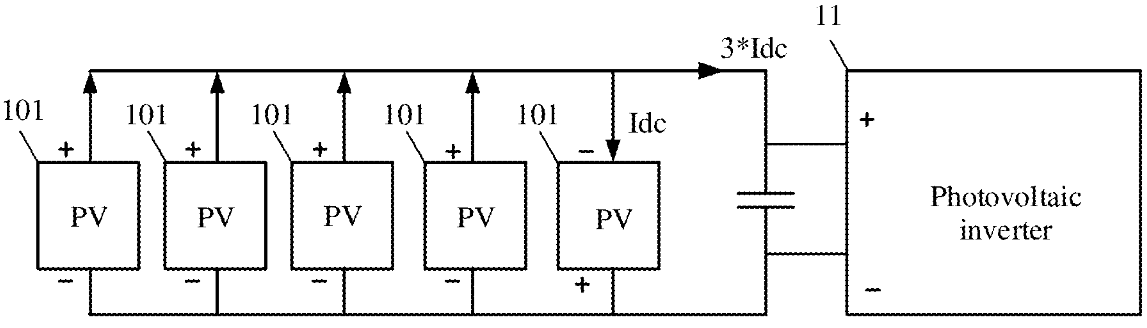
FIG. 8 shows a current status present after a circuit protection method in an embodiment is applied to a photovoltaic system in which a reverse polarity connection fault occurs.

FIG. 8 shows a current status present after the photovoltaic system 10 performs, for the reverse polarity connection fault, the circuit protection method 20. As shown in FIG. 8, after the part of redundancy protection in the circuit protection method 20 is performed, most of the reverse current flows into the photovoltaic inverter 11, and only a small part of the reverse current flows through the fifth photovoltaic unit 101 with the reverse polarity connection. It can be understood from comparison between FIG. 8 and FIG. 2 that the reverse current in the fifth photovoltaic unit 101 is greatly decreased, and a risk of the fifth photovoltaic unit 101 being burnt is reduced.

Figure 9:
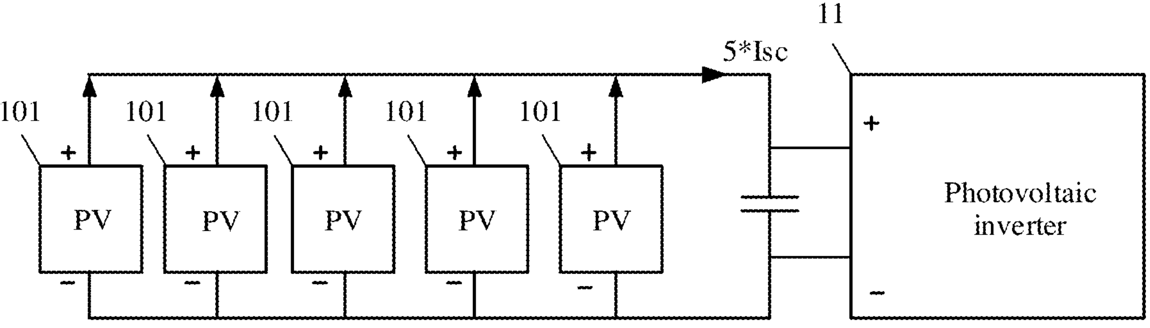
FIG. 9 shows a current status present after a circuit protection method in an embodiment is applied to a photovoltaic system in which an open-circuit voltage inconsistency fault occurs.

FIG. 9 shows a current status present after the photovoltaic system 10 performs, for the open-circuit voltage inconsistency fault, the circuit protection method 20. As shown in FIG. 9, after the part of redundancy protection in the circuit protection method 20 is performed, the reverse current flows into the photovoltaic inverter 11, and there may be no reverse current in the fifth photovoltaic unit 101. This can prevent the fifth photovoltaic unit 101 from being burnt.

The foregoing descriptions are merely specific implementations of the embodiments, but are not intended to limit their scope. Any variation or replacement readily figured out by a person skilled in the art shall fall within the scope of the embodiments.

The invention claimed is:

1. A photovoltaic system comprising:

an active protection switch, a direct current-direct current conversion circuit, and a controller, wherein a first end of the active protection switch is configured to connect to a photovoltaic module, a second end is connected to an input of the direct current-direct current conversion circuit, an output of the direct current-direct current conversion circuit is configured to connect to a load, and the controller is configured to:

when a reverse current of the photovoltaic module is greater than or equal to a current threshold, deliver, to the active protection switch based on an input voltage of the direct current-direct current conversion circuit, a breaking instruction used to trigger the active protection switch to be turned off; and when the active protection switch is not effectively turned off within preset duration after the breaking instruction is delivered to the active protection switch, regulate the input voltage of the direct current-direct current conversion circuit to be less than or equal to a first voltage threshold.

2. The photovoltaic system according to claim 1, wherein the controller is further configured to:

when detecting that the active protection switch is not effectively turned off, regulate the input voltage of the direct current-direct current conversion circuit to be greater than 0 and less than or equal to the first voltage threshold.

3. The photovoltaic system according to claim 2, wherein the controller is further configured to control the direct current-direct current conversion circuit to generate a target output voltage, to enable the input voltage of the direct current-direct current conversion circuit to be greater than 0 and less than or equal to the first voltage threshold.

4. The photovoltaic system according to claim 1, wherein the controller is further configured to:

when detecting that the active protection switch is not effectively turned off, control a switching component of the direct current-direct current conversion circuit to keep normally on.

5. The photovoltaic system according to claim 1, wherein the controller is further configured to:

when the reverse current of the photovoltaic module is greater than or equal to the current threshold, and the input voltage of the direct current-direct current conversion circuit is less than a fourth voltage threshold, deliver the breaking instruction to the active protection switch.

6. The photovoltaic system according to claim 1, wherein the controller is further configured to:

when the reverse current of the photovoltaic module is greater than or equal to the current threshold, and the input voltage of the direct current-direct current conversion circuit is greater than or equal to a third voltage threshold, regulate the input voltage of the direct current-direct current conversion circuit to be less than or equal to the first voltage threshold, and deliver the breaking instruction to the active protection switch, wherein the third voltage threshold is greater than the first voltage threshold.

7. The photovoltaic system according to claim 1, wherein the load comprises a direct current-alternating current conversion circuit, and the direct current-alternating current conversion circuit is connected to the output of the direct current-direct current conversion circuit and a power grid.

8. A circuit protection method for a photovoltaic system, wherein the photovoltaic system comprises an active protection switch, a direct current-direct current conversion circuit, and a controller, a first end of the active protection switch is configured to connect to a photovoltaic module, a second end is connected to an input of the direct current-direct current conversion circuit, an output of the direct current-direct current conversion circuit is configured to connect to a load, and the circuit protection method comprises:

when the reverse current of the photovoltaic module is greater than or equal to a current threshold, delivering a breaking instruction to the active protection switch based on an input voltage of the direct current-direct current conversion circuit, wherein the breaking instruction is used to trigger the active protection switch to be turned off; and when the active protection switch is not effectively turned off within preset duration after the breaking instruction is delivered to the active protection switch, regulating the input voltage of the direct current-direct current conversion circuit to be less than or equal to a first voltage threshold.

9. The circuit protection method according to claim 8, further comprising:

regulating the input voltage of the direct current-direct current conversion circuit to be greater than 0 and less than or equal to the first voltage threshold.

10. The circuit protection method according to claim 9, further comprising:

controlling the direct current-direct current conversion circuit to generate a target output voltage, to enable the input voltage of the direct current-direct current conversion circuit to be greater than 0 and less than or equal to the first voltage threshold.

11. The circuit protection method according to claim 8, further comprising:

controlling a switching component of the direct current-direct current conversion circuit to keep normally on.

12. The circuit protection method according to claim 8, further comprising:

detecting whether the input voltage of the direct current-direct current conversion circuit is greater than or equal to a fourth voltage threshold; and when the input voltage is less than the fourth voltage threshold, delivering the breaking instruction to the active protection switch.

13. The circuit protection method according to claim 8, further comprising:

detecting whether the input voltage of the direct current-direct current conversion circuit is greater than or equal to a third voltage threshold, wherein the third voltage threshold is greater than the first voltage threshold; and when the input voltage is greater than or equal to the third voltage threshold, regulating the input voltage of the direct current-direct current conversion circuit to be less than or equal to the first voltage threshold, and delivering the breaking instruction to the active protection switch.

14. The photovoltaic system of claim 1, wherein the controller is further configured to:

when the reverse current of the photovoltaic module is greater than or equal to the current threshold, the input voltage of the direct current-direct current conversion circuit is greater than or equal to a fourth voltage threshold, and it is detected that the reverse current is greater than the current threshold after specified duration, deliver the breaking instruction to the active protection switch.

15. The circuit protection method of claim 8, further comprising;

when the input voltage is greater than or equal to the fourth voltage threshold, and it is detected that the reverse current is greater than the current threshold after specified duration, delivering the breaking instruction to the active protection switch.

16. The circuit protection method of claim 8, further comprising;

when the input voltage is less than the third voltage threshold, delivering the breaking instruction to the active protection switch.

* * * * *